(12) United States Patent
Kuan et al.

(10) Patent No.: US 7,268,852 B2
(45) Date of Patent: Sep. 11, 2007

(54) LCOS DISPLAY PANEL HAVING A MICRO DICHROIC LAYER POSITIONED IN THE BACK PLANE TO FILTER COLORS

(75) Inventors: Ta-Shuang Kuan, Hsin-Chu Hsien (TW); Anthony Joseph Whitehead, Jr., Hsin-Chu (TW); Chia-Te Lin, Chia-Yi Hsien (TW); Chia-Tsung Chan, Tao-Yuan Hsien (TW)

(73) Assignee: United Microdisplay Optronics Corp., Hsin-Chu (TW)

( * ) Notice: Subject to any disclaimer, the term of this patent is extended or adjusted under 35 U.S.C. 154(b) by 285 days.

(21) Appl. No.: 10/904,156

(22) Filed: Oct. 27, 2004

(65) Prior Publication Data

US 2006/0087612 A1   Apr. 27, 2006

(51) Int. Cl.
   *C09K 19/60*   (2006.01)
   *G02F 1/1335*  (2006.01)
(52) U.S. Cl. ............................ 349/165; 349/5; 349/113
(58) Field of Classification Search .................... 349/5, 349/63, 113, 165
   See application file for complete search history.

(56) References Cited

U.S. PATENT DOCUMENTS

| 6,372,608 | B1* | 4/2002 | Shimoda et al. ............. 438/455 |
| 6,437,839 | B1* | 8/2002 | Cacharelis ................... 349/39 |
| 6,497,928 | B1* | 12/2002 | Sato et al. ................... 428/1.1 |
| 7,042,623 | B1* | 5/2006 | Huibers et al. .............. 359/291 |
| 2005/0253792 | A1* | 11/2005 | Shao et al. ................... 345/87 |

FOREIGN PATENT DOCUMENTS

JP   11-337932   12/1999

* cited by examiner

*Primary Examiner*—Mike Qi
(74) *Attorney, Agent, or Firm*—Winston Hsu

(57) ABSTRACT

An LCOS panel has a back plane, a plurality of pixel electrodes positioned on a surface of the back plane, a light absorbent layer positioned on the pixel electrodes, a micro dichroic layer positioned on the light absorbent layer, and a liquid crystal layer filled between the micro dichroic layer and the front plane.

21 Claims, 3 Drawing Sheets

LCOS DISPLAY PANEL HAVING A MICRO DICHROIC LAYER POSITIONED IN THE BACK PLANE TO FILTER COLORS

BACKGROUND OF INVENTION

1. Field of the Invention

The present invention pertains to an LCOS display panel, and more particularly, to a single-panel type LCOS display panel which utilizes a plurality of micro dichroic filters to implement both the mirror reflection and color separation functions.

2. Description of the Prior Art

LCOS (liquid crystal on silicon) display technology is the key to reflective LCD projectors and rear-projection televisions. The LCOS displays have the advantages of tiny size, high resolution, low power, low cost, etc. The difference between an LCOS display and a TFT-LCD is that the TFT-LCD uses a glass substrate or a quartz substrate as the back plane and is provided with a light source from the back side, while the LCOS display uses a silicon substrate as the back plane and is provided with a light source from the front side. As a result, the manufacturing of LCOS display panels can be integrated into standard semiconductor processes, and therefore has high stability and resolution.

Please refer to FIG. 1, which is a schematic diagram of a conventional LCOS display panel 10. As shown in FIG. 1, the LCOS display panel 10 includes a back plane 12, a plurality of pixel electrodes arranged in an array and positioned on the surface of the back plane 12, a front plane 16 positioned in parallel and above the back plane 12, a liquid crystal layer 18 interposed between the back plane 12 and the front plane 16, and a transparent electrode layer 20 positioned on the surface of the front plane 16 facing the back plane 12. In addition, the LCOS display panel 10 further includes a top alignment layer on the surface of the transparent electrode layer 20, and a bottom alignment layer 24 positioned on the surface of the pixel electrodes 14 for controlling the arrangement direction of the liquid crystal molecules in the liquid crystal layer 18. The back plane 12 is a silicon substrate, and includes a plurality of MOS elements for respectively driving each pixel electrode 14. The front plane 16 is a transparent substrate, such as a glass substrate or a quartz substrate. The pixel electrodes 14 are made of conductive materials, such as aluminum, and must have a mirror surface for reflective lights.

A LCOS display substantially includes an optical engine and an LCOS display panel, and LCOS displays can be classified into three-panel type LCOS displays and single-panel type LCOS displays. The optical engine used in the three-panel type LCOS display must be incorporated with color separation and color combination functions so as to divide the light source into a red light beam, a green light beam, and a blue light beam, project different light beams to three different LCOS display panels, and combine different light beams reflecting from different LCOS display panels to form a colorful image. Consequently, the three-panel type LCOS display has a large size and is more expensive.

On the other hand, the single-panel type LCOS display becomes more popular since only one single panel is used. The single-panel type LCOS display is classified into color wheel type LCOS display and color filter type LCOS display. The color wheel type LCOS display utilizes a color wheel system to separate a while light source into a red light beam, a green light beam, and a blue light beam, and projects different light beams to the LCOS display panel sequentially in a short period of time. By taking account of the vision persistence characteristic of human eyes, the viewer therefore sees a color image. The color filter type LCOS display includes a plurality of color filters positioned on the front plane, as an LCD display does, so as to form a color projection image. However, both the color wheel type LCOS display and the color filter type LCOS display have some disadvantages. The color wheel type display requires the color wheel system to perform the color separation function, and thus increases the cost and difficulties in designing. As to the color filter type LCOS display, the color filters positioned in the front plane must be precisely aligned with the pixel electrodes positioned in the back plane, which is not easily done. In addition, the color filters separate the light source by absorbing the undesired light beams, and the accumulated heat cannot be dissipated via the front plane. This is another problem to be solved for the color filter type LCOS display. Furthermore, since the pixel electrodes must have a mirror surface to reflect light beams, the process complexity is increased.

SUMMARY OF INVENTION

It is therefore a primary objective of the present invention to provide an LCOS display panel for solving the aforementioned problems.

According to a preferred embodiment of the present invention, an LCOS display panel is provided. The LCOS display panel includes a back plane, a plurality of pixel electrodes arranged in an array and positioned on a surface of the back plane, a light absorbent layer positioned on the pixel electrodes, a plurality of micro dichroic filters positioned on the light absorbent layer and corresponding to each pixel electrode, and a liquid crystal layer filled between the micro dichroic filters and the front plane.

These and other objectives of the present invention will no doubt become obvious to those of ordinary skill in the art after having read the following detailed description of the preferred embodiment that is illustrated in the various figures and drawings.

DETAILED DESCRIPTION

Figure 1:
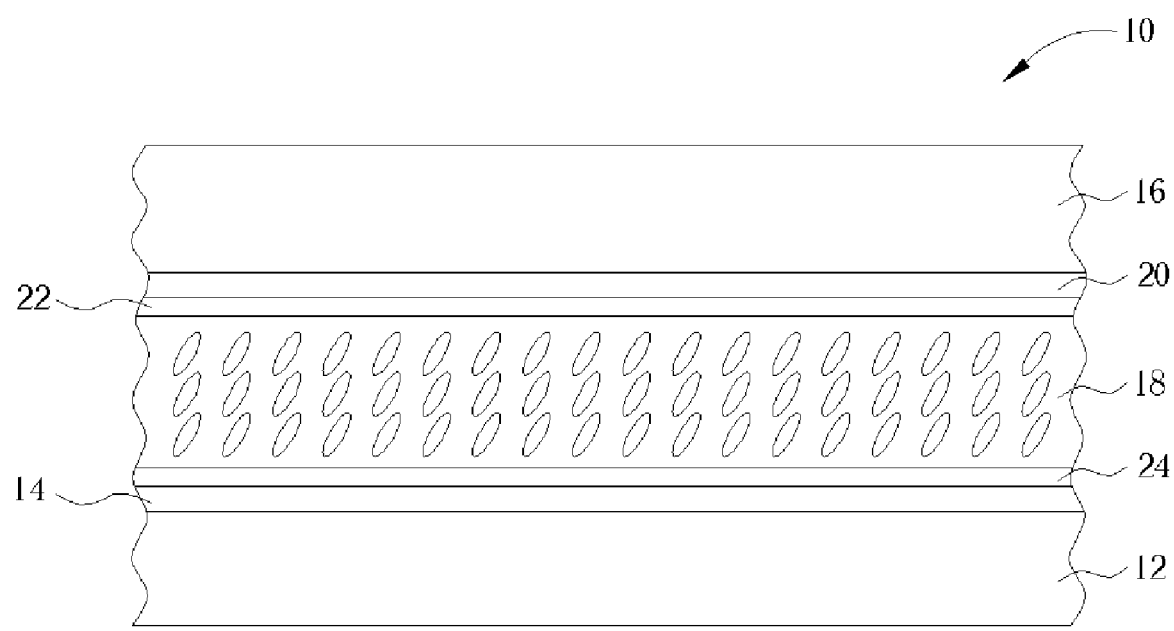
FIG. 1 is a schematic diagram of a conventional LCOS display pane.
Figure 2:
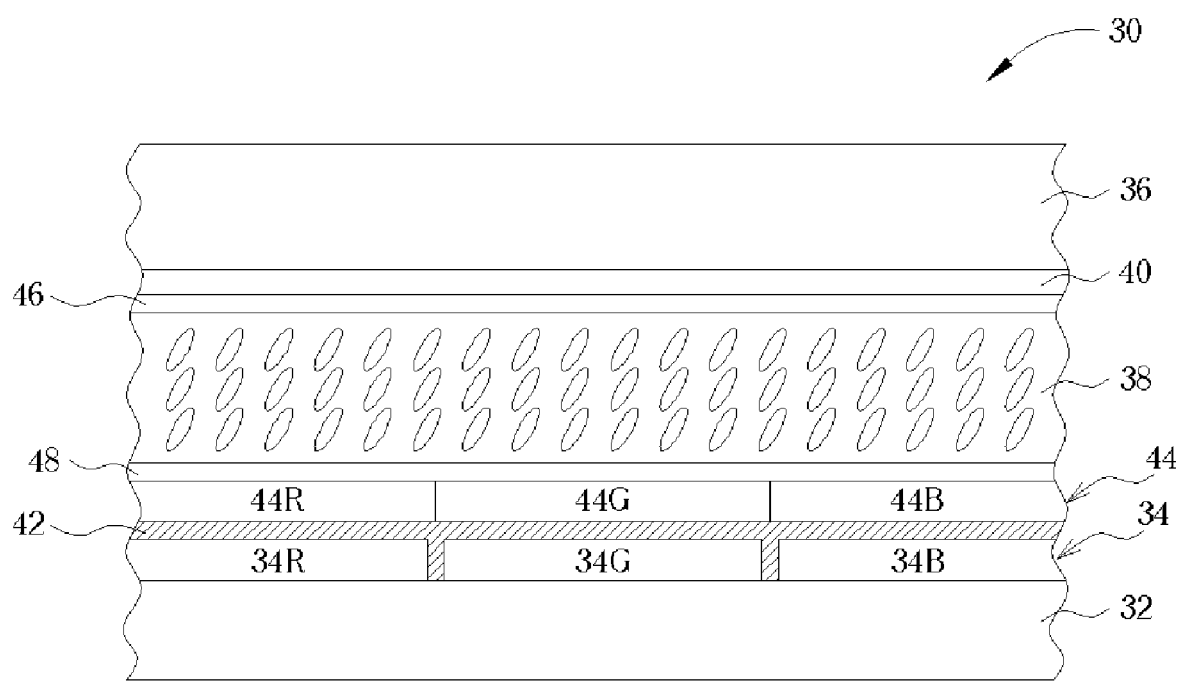
FIG. 2 is a schematic diagram of an LCOS display panel according to a preferred embodiment of the present invention.

Please refer to FIG. 2, which is a schematic diagram of an LCOS display panel 30 according to a preferred embodiment of the present invention. As shown in FIG. 2, the LCOS display panel 30 includes a back plane 32, a plurality of pixel electrodes 34 arranged in an array and positioned on the surface of the back plane 32, a front plane 36, a liquid crystal layer 38 interposed in between the back plane 32 and the front plane 34, and a transparent electrode layer 40 positioned on the surface of the front plane 36 facing the back plane 32. The LCOS display panel 30 further includes a light absorbent layer 42 positioned on the surface of the pixel electrodes 34, a plurality of micro dichroic filters 44 positioned on the surface of the light absorbent layer 42, a top alignment layer 46 positioned on the surface of the transparent electrode layer 40, and a bottom alignment layer 48 positioned on the surface of the micro dichroic filters 44.

The back plane 32 is a semiconductor substrate (such as a silicon substrate) including a plurality of MOS elements (not shown), fabricated by standard semiconductor processes, and each MOS element (not shown) is electrically connected to a corresponding pixel electrode 34 for controlling the pixel electrodes 34. The pixel electrodes 34 are made of conductive materials, such as aluminum or titanium nitride, for providing excellent electrical performance. The front plane 36 is a transparent substrate such as a glass substrate or a quartz substrate. The transparent electrode layer 40 is composed of transparent conductive materials, such as indium tin oxide (ITO), for providing a common voltage. The common voltage and the driving voltage provided by the pixel electrodes 34 generates different voltage differences in different pixel regions so as to drive the liquid crystal molecules in the liquid crystal layer 38 to rotate. The top alignment layer 46 and the bottom alignment layer 48 make the liquid crystal molecules rotate in predetermined directions so as to accurately control the amount of penetrating light beams.

The micro dichroic filters 44 and the light absorbent layer 42 of the present invention perform both the color separation and reflection functions, and the theorem is described as follows. It is to be noted that FIG. 2 only shows three pixel electrodes 34R, 34G, and 34B (which respectively represent the pixel electrodes of a red pixel region, a green pixel region, and a blue pixel region), and a red micro dichroic filter 44R, a green micro dichroic filter 44G, and a blue micro dichroic filter 44B. The micro dichroic filters 44 are stacked up by a plurality of optical thin films, such as titanium oxide or tantalum oxide. By utilizing different refractivities and optical characteristics of the optical thin films, the micro dichroic filters 44 are able to reflect light beams having a wavelength within a predetermined wavelength range, and to allow light beams having a wavelength beyond the predetermined wavelength range to penetrate so as to achieve the color separation function. In addition, the micro dichroic filters 44 have a mirror surface for performing a highly and equally reflection function. The light absorbent layer 42 is composed of materials having light absorptive characteristic such as chromium, and aims at absorbing the light beams passing through the micro dichroic filters 44.

The micro dichroic filters 44 are formed by various thin film technologies, such as PVD, CVD, planarization processes, etc., according to practical effects and requirements. In addition, for forming different micro dichroic filters 44 (the red micro dichroic filter 44R, the green micro dichroic filter 44G, and the blue micro dichroic filter 44B), three photolithography processes are consecutively performed, and the optical performance of each micro dichroic filter 44 can be finely controlled by adjusting different parameters, such as the composition and thickness of the optical thin films.

Accordingly, the red micro dichroic filter 44R is able to highly reflect the light beams having a wavelength within the wavelength range of red visible lights, and to allow the light beams having a wavelength beyond the wavelength range of red visible lights to penetrate. Likewise, the green micro dichroic filter 44G is able to highly reflect the light beams having a wavelength within the wavelength range of green visible lights, and to allow the light beams having a wavelength beyond the wavelength range of green visible lights to penetrate. The blue micro dichroic filter 44G is able to highly reflect the light beams having a wavelength within the wavelength range of blue visible lights, and to allow the light beams having a wavelength beyond the wavelength range of blue visible lights to penetrate. In addition, the light absorbent layer 42 is able to absorb the light beams penetrating the red micro dichroic filter 44R, the green dichroic filter 44G, and the blue micro dichroic filter 44G.

The LCOS display panel 30 of the present invention utilizes the micro dichroic filters 44 and the light absorbent layer 42 positioned in the back plane 32 to implement the color separation function. Consequently, the micro dichroic filters 44 and the pixel electrodes 34 are accurately aligned. In addition, since the light absorbent layer 42 is positioned on the pixel electrodes 34, the accumulated heat is dissipated outward via the back plane 32. Preferably, if a cooling device (not shown), such as a thermoelectric cooling device, is installed in the backside of the back plane 32, the heat dissipation effect is improved.

The LCOS display panel 30 of the above embodiment is applied to a single-panel type LCOS display, and thus includes a plurality of red micro dichroic filters 44R, a plurality of green micro dichroic filters 44G, and a plurality of blue micro dichroic filters 44B. By cooperating with an optical engine, the LCOS display panel 30 can generate a colorful projection image. However, it is to be noted that the LCOS display panel 30 can also be applied to a three-panel type LCOS display.

Figure 3:
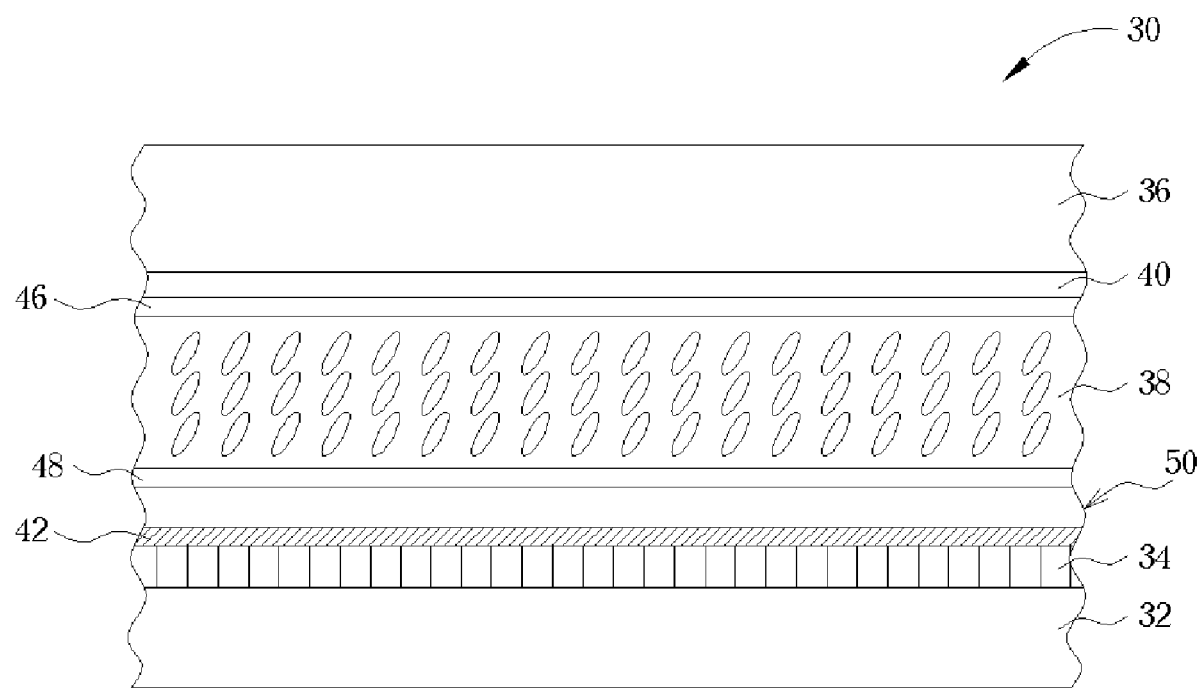
FIG. 3 is a schematic diagram of an LCOS display panel according to another preferred embodiment of the present invention.

Please refer to FIG. 3, which is a schematic diagram of an LCOS display panel 30 according to another preferred embodiment of the present invention where like numerals are used to indicate like elements in FIG. 3 and FIG. 2. As shown in FIG. 3, the LCOS display panel 30 includes a back plane 32, a plurality of pixel electrodes 34 arranged in an array and positioned on the surface of the back plane 32, a front plane 36, a liquid crystal layer 38 interposed in between the back plane 32 and the front plane 34, and a transparent electrode layer 40 positioned on the surface of the front plane 36 facing the back plane 32. The LCOS display panel 30 further includes a light absorbent layer 42 positioned on the surface of the pixel electrodes 34, a dichroic layer 50 positioned on the surface of the light absorbent layer 42, a top alignment layer 46 positioned on the surface of the transparent electrode layer 40, and a bottom alignment layer 48 positioned on the surface of the dichroic layer 50.

The LCOS display panel 30 of this embodiment is applied to a three-panel type LCOS display, and therefore only a single micro dichroic layer 50 is required. For example, if the LCOS display panel 30 is for providing the red display image, only a micro dichroic layer 50 composed of a plurality of optical thin films is required to reflect red light beams and allow non-red light beams to pass through. Likewise, the LCOS display panels 30 for providing the green display image and the blue display image respectively have micro dichroic layers 50 having different compositions and thickness.

In comparison with the prior art, the LCOS display panel utilizes the micro dichroic filters and the light absorbent layer positioned in the back plane to implement the color separation function. As a result, the micro dichroic filters and the pixel electrodes are accurately aligned. In addition, heat accumulated in the light absorbent layer is directly dissipated outward via the back plane.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An LCOS display panel comprising:
   a back plane comprising:
      a plurality of pixel electrodes arranged in an array on a surface of the back plane;
      a light absorbent layer positioned on the pixel electrodes; and
      a micro dichroic layer positioned on the light absorbent layer;
   a front plane positioned above the micro dichroic layer; and
   a liquid crystal layer filled in between the micro dichroic layer and the front plane.

2. The LCOS display panel of claim 1, wherein the light absorbent layer is used to absorb the light beams penetrating the micro dichroic layer.

3. The LCOS display panel of claim 1, wherein the micro dichroic layer comprises a plurality of optical thin films with different refractivities.

4. The LCOS display panel of claim 1, wherein the micro dichroic layer comprises a plurality of micro dichroic filters.

5. The LCOS display panel of claim 4, wherein each micro dichroic filter reflects light beams having a wavelength within a predetermined wavelength range, and allows light beams having a wavelength beyond the predetermined wavelength range to penetrate.

6. The LCOS display panel of claim 5, wherein the predetermined wavelength range is a wavelength range of red visible lights.

7. The LCOS display panel of claim 5, wherein the predetermined wavelength range is a wavelength range of green visible lights.

8. The LCOS display panel of claim 5, wherein the predetermined wavelength range is a wavelength range of blue visible lights.

9. The LCOS display panel of claim 1, wherein the LCOS display panel is a single-panel type LCOS display panel.

10. The LCOS display panel of claim 1, further comprising a transparent electrode layer on a surface of the front plane facing the back plane.

11. The LCOS display panel of claim 10, further comprising a top alignment layer positioned between the transparent electrode layer and the liquid crystal layer.

12. The LCOS display panel of claim 11, further comprising a bottom alignment layer positioned between the micro dichroic layer and the liquid crystal layer.

13. A LCOS display panel comprising:
   a back plane comprising:
      a plurality of pixel electrodes arranged in an array on a surface of the back plane; and
      a micro dichroic layer positioned above the pixel electrodes;
   a front plane positioned above the micro dichroic layer; and
   a liquid crystal layer filled in between the micro dichroic layer and the front plane.

14. The LCOS display panel of claim 13, further comprising a light absorbent layer positioned between the pixel electrodes and the micro dichroic layer for absorbing light beams penetrating the micro dichroic layer.

15. The LCOS display panel of claim 13, wherein the micro dichroic filter comprises a plurality of optical thin films with different refractivities.

16. The LCOS display panel of claim 13, wherein the micro dichroic layer comprises a plurality of red micro dichroic filters, a plurality of green micro dichroic filters, and a plurality of blue micro dichroic filters.

17. The LCOS display panel of claim 16, wherein the red micro dichroic filters reflect light beams having a wavelength within a wavelength range of red visible lights, and allow light beams beyond the wavelength range of red visible lights.

18. The LCOS display panel of claim 16, wherein the green micro dichroic filters reflect light beams having a wavelength within a wavelength range of green visible lights, and allow light beams beyond the wavelength range of green visible lights.

19. The LCOS display panel of claim 16, wherein the blue micro dichroic filters reflect light beams having a wavelength within a wavelength range of blue visible lights, and allow light beams beyond the wavelength range of blue visible lights.

20. The LCOS display panel of claim 13, further comprising a transparent electrode layer positioned on a surface of the front plane facing the back plane.

21. The LCOS display panel of claim 20, further comprising a top alignment layer positioned between the transparent electrode layer and the liquid crystal layer, and a bottom alignment layer positioned between the micro dichroic layer and the liquid crystal layer.

* * * * *